_United States Patent Office_

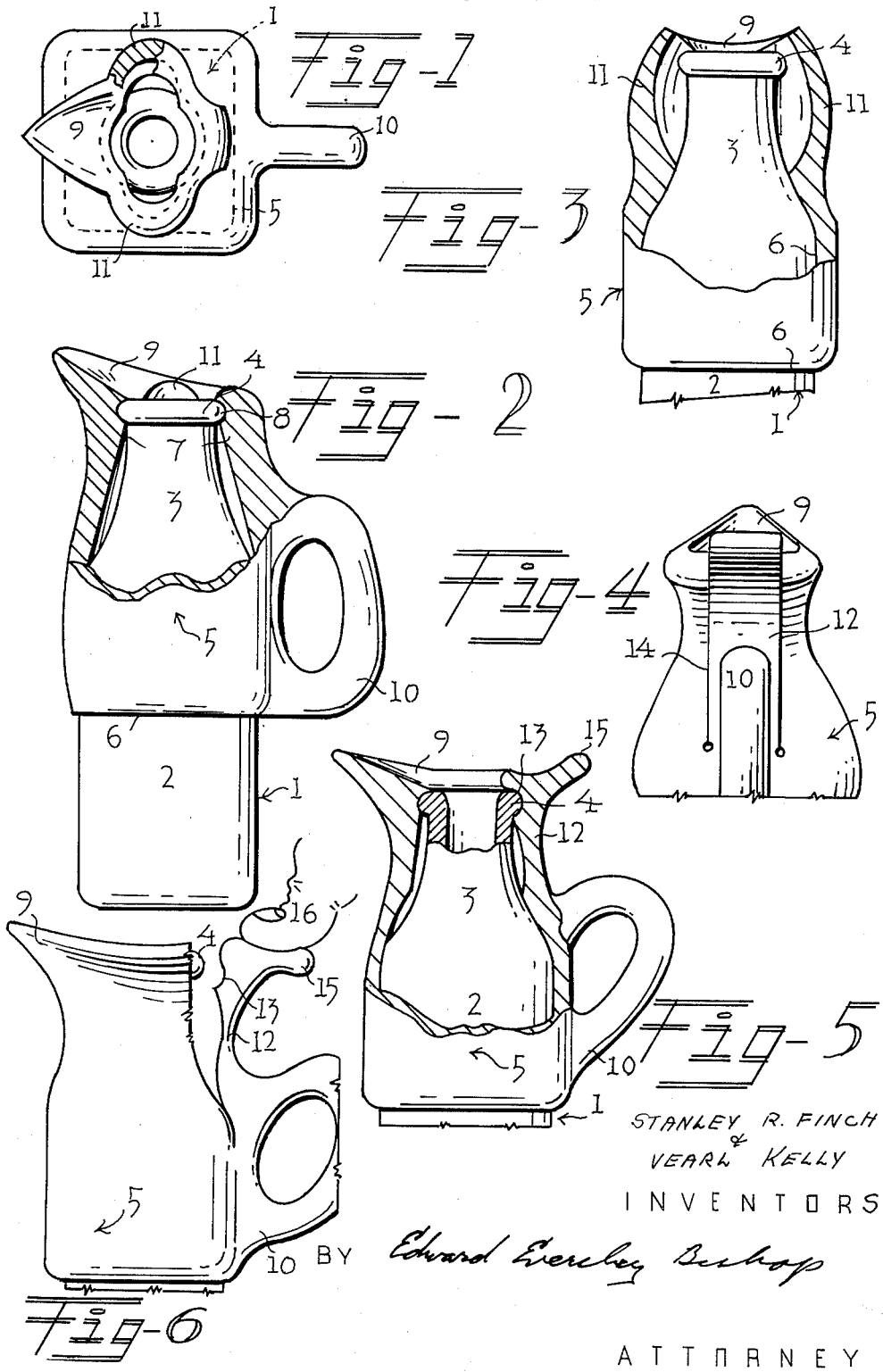

3,096,911
Patented July 9, 1963

3,096,911
POURING SPOUT FOR MILK BOTTLES AND THE LIKE
Stanley R. Finch, Edmonton, Alberta, and Vearl Kelly, Calgary, Alberta, Canada
Filed Sept. 26, 1960, Ser. No. 58,328
2 Claims. (Cl. 222—183)

This invention relates generally to pouring device and particularly to a pouring spout for use with conventional milk bottles and the like.

In the handling and delivery of milk products, it is common to use glass bottles, either of round or square configuration. In some cases, the milk or milk products from such bottles is poured into a pouring device such as a pitcher or the like prior to use, but, in many cases, the milk products are poured directly from the milk bottles.

The glass milk bottles now in common use include a body with a reduced neck and with an annular lip at the top of the neck with a recess therein for the reception of the milk bottle cap. While this construction is satisfactory for a container for milk products, its design does not lend itself particularly to the pouring of milk products therefrom and, as a result, it is not infrequent for the milk products to pour too fast or too slow and to become spilled during the pouring operation. Again such bottles are usually kept in a refrigerator or the like and when first removed from the refrigerator can be slippery and difficult to hold during the pouring operation.

We have found that the difficulties encountered in the pouring of milk products from the bottles may be eliminated by the application of a simple pouring spout to the milk bottles. We are aware that numerous other pouring spouts have been developed for use with bottles and cans, although we have found the majority of these spouts to be unsatisfactory, either from the viewpoint of difficulty in maintaining the spouts in a clean and sanitary condition or in the fact that considerable difficulty is experienced in applying the spouts to the bottles and in removing the spouts from the bottles when no longer required.

Our improved pouring spout is designed to be manufactured from sanitary low cost materials which may be molded simply and easily into the desired shapes and which may be sold to the consumer public at an attractive price.

Numerous other advantages of our improved pouring spout will be obvious when the following specification is read in the light of the attached drawings. It must be understood that while a specific embodiment is described and illustrated, various changes and modifications as fall within the scope of the appended claims may be made without departing from the inventive spirit and scope thereof.

In the drawings, illustrating preferred embodiments:

FIGURE 1 is a top plan view showing our spout applied to a milk bottle and partly broken away to illustrate its construction.

FIGURE 2 is a side elevation of my device again partly broken away to illustrate its application to a milk bottle.

FIGURE 3 is another side view viewed at 90 degrees with respect to FIGURE 2 and again partly broken away to illustrate the construction thereof.

FIGURE 4 is a side view illustrating an alternate construction for our pouring spout.

FIGURE 5 is a side view viewed at 90 degrees with respect to FIGURE 4 and partly broken away to illustrate its construction.

FIGURE 6 is a side view similar to FIGURE 5 illustrating the manipulation of the releasing mechanism for the pouring spout.

With reference now to the drawings, there is shown a milk bottle referred to generally at 1 and consisting of a body 2, a reduced neck 3 and an annular lip 4 at the top of the reduced neck 3. While the milk bottle illustrated is of rectangular form, it should be understood that a bottle of round construction could be used with appropriate changes in the jacket of the pouring spout.

Our pouring spout attachment comprises the jacket designated generally at 5 and constructed with an enlarged lower end 6 of sufficient size to pass over the lip 4 and reduced neck 3 of the bottle and to fit snugly against the sides of the body 2 of the milk bottle when the jacket is in position thereon. The jacket is also constructed with a reduced upper portion as indicated at 7 and with an annular groove 8 formed therein to engage on the lip 4 of the bottle and secure the jacket 5 against accidental dislodgment.

A pouring spout 9 extends from the jacket 5 on one side thereof to convey milk poured from the bottle and a gripping handle 10 is positioned on the opposite side of the jacket to facilitate pouring products from the bottle via the spout 9.

To permit removal of the jacket 5 from the bottle, the reduced portion 7 is distended on opposite sides as indicated at 11 away from the neck 3 of the bottle and it will be obvious that as the distended portions 11 are squeezed toward the neck 3 of the bottle, the annular groove 8 in the reduced upper end 7 will be forced away from engagement with the lip 4 and the jacket 5 may then be lifted from the bottle for cleaning or attachment to another bottle.

In the alternate embodiment illustrated in FIGURES 4, 5 and 6 in the drawings, the jacket 5 is of substantially similar construction including a pouring spout 9 and a handle 10, although, in this case, only the catch 12 is provided with a groove 13 to engage with the lip 4 on the bottle. The catch 12 is an integral part of the jacket 5 and is formed by the parallel slits 14 cut in the jacket 5 on opposite sides of the handle 10. To facilitate manual operation of the catch 12, there is provided a button 15 which may be pressed with the thumb 16 of an operator to withdraw the catch and release the jacket 5 for the bottle as desired.

It will now be seen that we have provided a simple low cost device that may be attached or detached quickly and easily from a milk bottle and the like to provide satisfactory pouring of milk products therefrom without spilling the milk product. In addition, the unitary construction of our device lends itself to cleanliness and to use with a minimum of effort.

What we claim as our invention is:

1. A pouring device for milk bottles of the class having a body with a reduced neck and a lip at the top of the neck comprising, a jacket having an enlarged lower end to pass over the neck of the bottle and fit closely on the body, a reduced upper portion on the jacket to fit against the neck of the bottle, an annular internal groove in the reduced upper portion to engage over the lip of the bottle to hold the jacket on the bottle, a pouring spout extending from the jacket on one side thereof, a gripping handle integral with the jacket and extending on the opposite side of the jacket, opposed sections of the reduced upper neck portion distended laterally away from the neck and adapted to co-act with the remainder of the reduced upper portion to disengage the annular internal groove from the lip when the opposed sections are squeezed towards the neck and thereby release engagement of the reduced upper portion with the lip of the bottle.

2. In a pouring device for milk bottles of the class having a body with a reduced neck and a lip at the top of the reduced neck, a jacket having an enlarged lower end adapted to pass over the neck and to fit tightly against the body of the bottle, a reduced upper portion on the jacket adapted to fit against the neck of the bottle, an internal groove in the reduced upper portion arranged to engage over one side of the lip, a manual releasable catch integral with the reduced upper portion, such catch arranged to engage with the lip of the bottle oppositely to the annular groove, a pouring spout extending from the jacket on the side associated with the annular internal groove, a gripping handle located on the opposite side of the jacket and a button extending from the manually releasable catch whereby the catch may be disengaged from the lip of the bottle.

References Cited in the file of this patent

UNITED STATES PATENTS

| | | |
|---|---|---|
| 1,351,330 | Herschmann | Aug. 31, 1920 |
| 1,381,754 | Schrader | June 14, 1921 |
| 2,049,219 | Muschinske et al. | July 28, 1936 |